US010006455B2

(12) United States Patent
Tajima et al.

(10) Patent No.: US 10,006,455 B2
(45) Date of Patent: Jun. 26, 2018

(54) DRIVE CONTROL APPARATUS

(71) Applicant: FUJI ELECTRIC CO., LTD., Kanagawa (JP)

(72) Inventors: Hirokazu Tajima, Tokyo (JP); Hiroji Nishida, Tokyo (JP)

(73) Assignee: FUJI ELECTRIC CO., LTD, Kawasaki-shi, Kanagawa (JP)

( * ) Notice: Subject to any disclaimer, the term of this patent is extended or adjusted under 35 U.S.C. 154(b) by 16 days.

(21) Appl. No.: 15/600,984

(22) Filed: May 22, 2017

(65) Prior Publication Data

US 2017/0254325 A1  Sep. 7, 2017

Related U.S. Application Data

(63) Continuation of application No. PCT/JP2016/055278, filed on Feb. 23, 2016.

(30) Foreign Application Priority Data

Apr. 24, 2015 (JP) .................................. 2015-089082

(51) Int. Cl.
*G05B 9/02* (2006.01)
*F04B 49/06* (2006.01)
*G05B 23/02* (2006.01)

(52) U.S. Cl.
CPC .............. *F04B 49/065* (2013.01); *G05B 9/02* (2013.01); *G05B 23/0218* (2013.01); *G05B 2219/26* (2013.01)

(58) Field of Classification Search
CPC ...... F02D 41/009; F02D 41/105; F02D 41/28; G05B 9/02; G05B 19/0428; H02H 3/08;
(Continued)

(56) References Cited

U.S. PATENT DOCUMENTS 4,763,296 A * 8/1988 Gercekci ............. G06F 11/0757
714/55
4,866,713 A * 9/1989 Worger ............... G06F 11/0757
714/25
(Continued)

FOREIGN PATENT DOCUMENTS

JP   H10-011408   1/1998
JP   H11-053207   2/1999
(Continued)

*Primary Examiner* — Rina Duda
(74) *Attorney, Agent, or Firm* — IPUSA, PLLC

(57) ABSTRACT

There is provided a drive control apparatus that can maintain a drive control system to be in a safe state even in a case where operational abnormality of avoiding a normal reset of a control processor or operational abnormality of avoiding solution even after resetting the control processor occurs in the control processor. The control processor includes an actuator control processing unit configured to generate a control signal for a drive circuit being a control target apparatus and an actuator, and a diagnosis processing unit configure to diagnosing the actuator control processing unit. The diagnosis processing unit cyclically outputs a reset signal to WDT in a case where the operation of the control processor is normal. The WDT continuously outputs a cutoff signal for cutting off a supply of the control signal from the control processor to the control target apparatus when the cyclic reset signal stops.

8 Claims, 5 Drawing Sheets

(58) Field of Classification Search
CPC ... H02H 7/122; H02P 29/0241; H02P 29/032; H02P 3/18; H02P 4/00; H02P 8/36; H03K 17/24; H03K 17/284; H04L 1/22
USPC .......................... 318/563, 565; 388/909, 921
See application file for complete search history.

(56) References Cited

U.S. PATENT DOCUMENTS

| | | | | |
|---|---|---|---|---|
| 4,956,842 A * | 9/1990 | Said | G06F 11/2215 | 714/41 |
| 5,175,845 A * | 12/1992 | Little | G06F 1/24 | 713/321 |
| 5,203,000 A * | 4/1993 | Folkes | G06F 1/24 | 327/143 |
| 5,233,613 A * | 8/1993 | Allen | G06F 11/0757 | 714/23 |
| 5,450,403 A * | 9/1995 | Ichii | H04L 1/08 | 340/3.44 |
| 5,454,113 A * | 9/1995 | Graf | G05B 19/0428 | 326/9 |
| 5,541,943 A * | 7/1996 | Niescier | G06F 11/0757 | 714/51 |
| 5,594,865 A * | 1/1997 | Saitoh | G06F 11/0757 | 714/55 |
| 5,754,462 A * | 5/1998 | Little | G06F 1/24 | 714/22 |
| 5,768,496 A * | 6/1998 | Lidgett | G06F 11/0745 | 714/25 |
| 6,256,569 B1 * | 7/2001 | Kobayashi | B60T 8/4881 | 340/438 |
| 6,411,872 B1 * | 6/2002 | Fujita | G06F 11/0757 | 180/117 |
| 6,498,403 B1 * | 12/2002 | Hagidaira | B62D 5/0484 | 307/10.1 |
| 6,587,966 B1 * | 7/2003 | Chaiken | G06F 11/0757 | 713/2 |
| 6,591,389 B1 * | 7/2003 | Daudelin | G06F 11/2268 | 714/733 |
| 6,775,609 B2 | 8/2004 | Ozeki et al. | | |
| 6,799,110 B2 * | 9/2004 | Hashimoto | F02D 11/107 | 123/198 D |
| 6,957,368 B2 * | 10/2005 | Neumiller | H04L 1/22 | 607/5 |
| 6,979,973 B2 * | 12/2005 | Yoo | B41J 29/38 | 318/567 |
| 7,024,550 B2 * | 4/2006 | Collins | G06F 11/1417 | 713/2 |
| 7,239,097 B2 * | 7/2007 | Hashimoto | H02P 4/00 | 318/400.08 |
| 7,253,577 B2 * | 8/2007 | Campbell | G05B 9/02 | 318/563 |
| 7,453,678 B2 * | 11/2008 | Beneditz | G06F 1/305 | 361/93.2 |
| 7,907,378 B2 * | 3/2011 | Julicher | G06F 1/28 | 361/93.1 |
| 8,155,824 B2 * | 4/2012 | Sakai | B60W 50/0205 | 701/29.2 |
| 8,291,205 B2 * | 10/2012 | Suryawanshi | G06F 1/24 | 713/1 |
| 8,311,700 B2 * | 11/2012 | Murakami | B60W 30/188 | 123/350 |
| 8,448,029 B2 * | 5/2013 | Snead | G06F 11/0724 | 714/55 |
| 8,803,456 B2 * | 8/2014 | Zushi | H02H 7/122 | 318/400.22 |
| 2003/0074594 A1 * | 4/2003 | Hirakawa | G06F 11/0757 | 713/500 |
| 2003/0100975 A1 * | 5/2003 | Hashimoto | F02D 11/107 | 701/1 |
| 2003/0140274 A1 * | 7/2003 | Neumiller | H04L 1/22 | 714/24 |
| 2005/0122080 A1 * | 6/2005 | Yoo | B41J 29/38 | 318/696 |
| 2006/0036879 A1 * | 2/2006 | Wahler | G06F 1/206 | 713/300 |
| 2006/0044723 A1 * | 3/2006 | Beneditz | G06F 1/305 | 361/90 |
| 2006/0261749 A1 * | 11/2006 | Campbell | G05B 9/02 | 315/291 |
| 2007/0047195 A1 * | 3/2007 | Merkin | G06F 1/206 | 361/679.31 |
| 2007/0114956 A1 * | 5/2007 | Hashimoto | H02P 4/00 | 318/139 |
| 2008/0007909 A1 * | 1/2008 | Merkin | G06F 1/206 | 361/601 |
| 2008/0140890 A1 * | 6/2008 | Klosters | G06F 11/0757 | 710/107 |
| 2008/0151456 A1 * | 6/2008 | Julicher | G06F 1/28 | 361/93.4 |
| 2008/0238192 A1 * | 10/2008 | Hashimoto | H02J 1/14 | 307/10.1 |
| 2008/0263379 A1 * | 10/2008 | Tuuk | G06F 9/3861 | 713/375 |
| 2009/0030587 A1 * | 1/2009 | Yonezawa | F02D 41/009 | 701/103 |
| 2009/0193230 A1 * | 7/2009 | Findeisen | G06F 21/445 | 712/34 |
| 2009/0198407 A1 * | 8/2009 | Sakai | B60W 50/0205 | 701/29.1 |
| 2010/0036558 A1 * | 2/2010 | Murakami | B60W 30/188 | 701/31.4 |
| 2010/0235558 A1 * | 9/2010 | Snead | G06F 11/0724 | 710/267 |
| 2010/0268989 A1 * | 10/2010 | Otani | G03G 15/50 | 714/25 |
| 2010/0306518 A1 * | 12/2010 | Suryawanshi | G06F 1/24 | 713/1 |
| 2013/0278191 A1 * | 10/2013 | Zushi | H02H 7/122 | 318/400.22 |
| 2015/0006978 A1 * | 1/2015 | Tokunaga | G06F 11/0724 | 714/55 |
| 2015/0073604 A1 * | 3/2015 | Ro | B60H 1/00971 | 700/276 |
| 2016/0349833 A1 * | 12/2016 | Hara | G06F 1/14 | |

FOREIGN PATENT DOCUMENTS

| | | |
|---|---|---|
| JP | 2002-089336 | 3/2002 |
| JP | 2003-097345 | 4/2003 |
| JP | 2004-034746 | 2/2004 |
| JP | 2010-043536 | 2/2010 |
| JP | 2011-061927 | 3/2011 |
| JP | 2014-032558 | 2/2014 |
| JP | 2014-048849 | 3/2014 |

* cited by examiner

DRIVE CONTROL APPARATUS

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2016/055278 filed on Feb. 23, 2016, which is based upon and claims the benefit of priority of the prior Japanese Patent Application No. 2015-089082 filed on Apr. 24, 2015, the entire contents of which are incorporated herein by reference.

BACKGROUND OF THE INVENTION

1. Field of the Invention

The present invention relates to a drive control apparatus including a watchdog timer.

2. Description of the Related Art

In a drive control system that performs a drive control of a control target apparatus such as an actuator using a central processing unit (hereinafter, referred to as a CPU), a countermeasure to an abnormality or a failure is positively required. Therefore, various techniques of monitoring the CPU to detect the abnormality or the failure are being developed. For example, in the technique disclosed in Patent Document 1, a monitoring IC is provided in addition to the monitor target CPU to be monitored. This monitoring IC monitors operational states of a torque monitoring unit and a signal abnormality diagnosing unit of the CPU and performs a fail-safe control in collaboration with a self-monitoring unit of a microcomputer if the monitoring IC detects an operational abnormality.

However, in this technique disclosed in Patent Document 1, the operational abnormality detected for the CPU by the monitoring IC is limited to specific abnormality such as operational abnormality in a torque monitoring unit and operational abnormality in a signal abnormality diagnosing unit. Further, the technique disclosed in Patent Document 1 has a problem that a wide range of operational abnormality, which may be caused in the operation of the CPU, such as operational abnormality of arithmetic logic unit (ALU), operational abnormality of a data path, operational abnormality of a register, operational abnormality of an internal RAM, operational abnormality of an address calculation, operational abnormality of interrupt processing, operational abnormality of control logic, and operational abnormality of a configuration register operational abnormality, is not dealt with by detecting this wide range of operational abnormality.

One countermeasure against a wide range of operational abnormality, which may be caused in the operation of the CPU, is a measure using a watchdog timer. For example, in the technique disclosed in, for example, Patent Document 2, a pulse signal is periodically supplied from the CPU to the watchdog timer to reset the watchdog timer. If the operational abnormality occurs to prevent the pulse signal from being supplied for a predetermined time duration, the watchdog timer outputs a reset signal to the CPU to cause the CPU to perform a reset process. Further, in the technique disclosed in Patent Document 3, the watchdog timer is provided in a manner similar to the Patent Document 2. However, if supply of a periodic watchdog timer clear signal is stopped, the watchdog timer determines that the CPU does not normally operate and send an error report to a higher-level system.

RELATED-ART DOCUMENTS

Patent Document

Patent Document 1: Japanese Unexamined Patent Application Publication No. 2010-43536
Patent Document 2: Japanese Unexamined Patent Application Publication No. 2003-97345
Patent Document 3: Japanese Unexamined Patent Application Publication No. 2014-32558

SUMMARY OF THE INVENTION

The present invention provides a drive control apparatus characterized by including a control processor configured to generate a control signal, and a watchdog timer configured to reset a timer value in response to a reset signal supplied from the control processor and complete measurement of a target timer time after resetting the timer so as to continuously output a cutoff signal for cutting off a supply of the control signal from the control processor to a control target apparatus.

According to the invention, when the supply of a reset signal from the control processor to the watchdog timer stops, the watchdog timer completes measurement of a target timer time so as to continuously cutoff a supply of the control signal. Therefore, when the operational abnormality of avoiding the control processor from normally operating or the operational abnormality unsolved after resetting the control processor occurs in the control processor, the control target apparatus can be prevented from suffering from a bad influence of the operational abnormality in the control processor and the drive control system can be maintained to be in a safe state.

In a preferred mode, the control processor includes a diagnosis means for diagnosing an operation of the control processor and a safe state transition processing means that causes the control processor to transfer to a safe state where the operation range is limited in comparison with the operation range in a normal state in a case where the abnormality in the operation of the control processor is diagnosed to exist.

According to this mode, when the operational abnormality of the watchdog timer itself occurs and the watchdog timer cannot cutoff a supply of a control signal to the control target apparatus at a time of the occurrence of the operational abnormality in the control processor, the control processor can transfer to the safe state, and the drive control system can be maintained to be in the safe state.

In the preferred mode, the diagnosis means repeats the diagnosis in a cycle shorter than the target timer time and outputs the reset signal in a case where it is diagnosed to determine that the control processor is normal.

According to this mode, in a case where the diagnosis means diagnoses to determine that there is the abnormality in the operation of the control processor, the safe state transition processing means causes the control processor to transfer to the safe state before the watchdog timer outputs the cutoff signal. Therefore, the safety of the control target apparatus can be ensured.

In the preferred mode, the safe state transition processing means causes the control processor to output a control signal for setting the control target apparatus to be in the safe state having the operation range limited in comparison with the normal state in the case where the diagnosis means diagnoses to determine that the abnormality exists in the operation of the control processor.

In this mode, the operation range of the control target apparatus is limited in a case where the operational abnormality of the control processor is diagnosed to exist. Therefore, the safety of the control target apparatus can be ensured.

In the preferred mode, the safe state transition processing means stops an output of the control signal from the control processor in case where the operational abnormality of the control processor is diagnosed to exist.

According to this mode, after the operational abnormality of the control processor is diagnosed to exist, it is possible to prevent the influence of the operational abnormality in the control processor from effecting on the control target apparatus.

In the preferred mode, the safe state transition processing means causes the control processor to output a control signal for the control target apparatus of transiting to be in a predetermined safe state in conformity with a passage of time in the case where the diagnosis means diagnoses to determine that the abnormality exists in the operation of the control processor.

According to this mode, the driving state of the control target apparatus can be caused to gradually transfer to the safe state along with the passage of time in the case where the abnormality is diagnosed to exist in the operation of the control processor. Therefore, it is possible to prevent the operation of the control target apparatus from being unstable.

In the preferred mode, the control processor includes a communication means reporting the operational abnormality in the control processor in the case where the diagnosis means diagnoses to determine that the abnormality exists in the operation of the control processor. According to this mode, the higher-level controller can recognize the operational abnormality in the control processor.

In the preferred mode, the safe state transition processing means sets the control processor to be in a hold state in the case where the diagnosis means diagnoses to determine that the abnormality exists in the operation of the control processor. According to this mode, it is possible to prevent the operational abnormality in the control processor from being conspicuous because the control processor is in the hold state.

DESCRIPTION OF THE PREFERRED EMBODIMENTS

Here, the technique disclosed in Patent Document 2 has a problem that there is no countermeasure against a case where the reset function of the CPU being a control processor does not normally operate even if a rest signal is given. Further, the technique disclosed in Patent Document 2 has a problem that even if the reset function of the CPU being the control processor normally operates, a normal operation of the CPU is not ensured after resetting the CPU. The technique disclosed in Patent Documents 2 and 3 has a problem that, in a case where the operation of the watchdog timer becomes abnormal, it is difficult to maintain the drive control system to be in a safe state.

The present invention is provided in consideration of the above described situation. The first object of the invention is to provide a drive control apparatus that can maintain a drive control system to be in a safe state even in a case where operational abnormality of avoiding a control processor from normally operating or operational abnormality unsolved after resetting the control processor occurs in the control processor. The second object of the invention is to provide the drive control apparatus that can maintain the drive control system to be in a safe state even in a case where operational abnormality occurs in the watchdog timer itself.

A description of embodiments of the present invention is given below, with reference to the FIG. 1 through FIG. 7.

Figure 1:
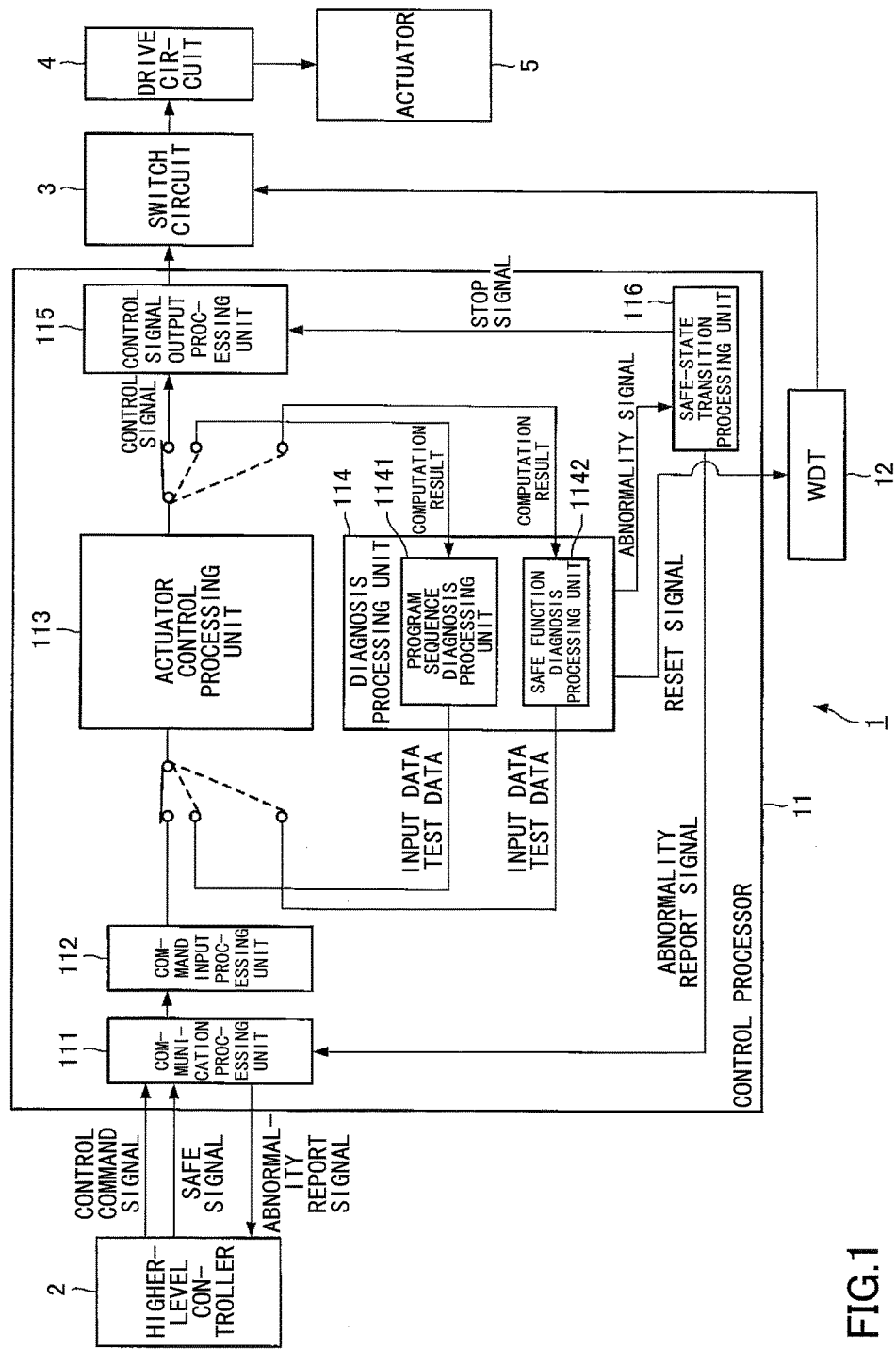
FIG. 1 is a block diagram illustrating a drive control system including a drive control apparatus 1 of an embodiment of the present invention.

FIG. 1 is a block diagram illustrating a drive control system including a drive control apparatus 1 of an embodiment of the present invention. As illustrate in FIG. 1, this drive control system includes a drive control apparatus 1, a higher-level controller 2, a switch circuit 3, a drive circuit 4 that is a control target apparatus of the drive control apparatus 1, and an actuator 5.

The higher-level controller 2 includes a control device such as a programmable logic controller (PLC) and a safety device such as a safety relay. The higher-level controller 2 supplies the control command signal generated based on an operation or the like by the user to the drive control apparatus 1. Further, the higher-level controller 2 generates the safe signal and supplies the safe signal to the drive control apparatus 1 in a case where an occurrence of danger such as approach of a worker to the actuator 5 or in a case where an emergency stop button is pushed in a drive control system. Further, the higher-level controller 2 receives an abnormality report signal indicative of abnormality of a control processor 11 (described below) of the drive control apparatus 1 from the drive control apparatus 1, and conducts a process corresponding to the abnormality report signal such as generation of an alarm.

The switch circuit 3 is provided between the drive control apparatus 1 and the drive circuit 4. This switch circuit 3 ordinarily supplies a control signal output by the drive control apparatus 1 to the drive circuit 4. However, when a cutoff signal is applied by the drive control apparatus 1, the switch circuit 3 is turned off so as to cut off the supply of the control signal from the drive control apparatus 1 to the drive circuit 4.

The drive circuit 4 is, for example, a main circuit of the inverter and formed by multiple switching elements. The drive circuit 4 turns on the switching element based on the control signal supplied from the drive control apparatus 1 to supply a drive voltage to the actuator 5 through the switching element. The actuator 5 is, for example, a motor.

The drive control apparatus 1 generates a control signal based on the control command signal or the safe signal, supplies the control signal through the switch circuit 3 to the drive circuit 4 to control drive of the actuator 5. Referring to FIG. 1, this drive control apparatus 1 includes a control processor 11 and a watchdog timer (hereinafter, WDT) 12. The WDT 12 includes a counter of counting a clock having a predetermined cycle. When a reset signal is supplied from the control processor 11, the WDT 12 sets a count value (said differently, a timer value) of the clock to be zero. Further, the WDT 12 continuously supply the cutoff signal to the switch circuit 3 when the timer value reaches a predetermined target timer time.

The control processor 11 is a means for generating a control signal for controlling the actuator 5 based on the control command signal or the safe signal, each of which is supplied from the higher-level controller 2. This control processor 11 is a CPU, in which a CPU core, a ROM storing a program executed by the CPU core, and a RAM used as a work area by the CPU core. Referring to FIG. 1, the CPU core, the ROM, and the RAM are omitted from illustration. The functions substantialized by the CPU core (hereinafter, simply referred to as the control processor 11) of the control processor 11 of executing the program inside the ROM can be roughly classified into, as illustrated in FIG. 1, a communication processing unit 111, a command input processing unit 112, an actuator control processing unit 113, a diagnosis processing unit 114, a control signal output processing unit 115, and a safe-state transition processing unit 116.

The communication processing unit 111 is a means for receiving the control command signal and the safe signal from the higher-level controller 2. In a case where the communication processing unit 111 receives the abnormality report signal from the safe-state transition processing unit 116, the communication processing unit 111 sends the abnormality report signal to the higher-level controller 2. Thereafter, the communication processing unit 111 rejects receipt of the control command signal and the safe signal from the higher-level controller 2. However, in a case where the higher-level controller 2 determines the content of the abnormality report signal and sends a return command signal, the communication processing unit 111 receives this return command signal and restarts the receipt of the control command signal and the safe signal from the higher-level controller 2. The command input processing unit 112 is a means for transferring the control command signal and the safe signal from the higher-level controller 2 by the communication processing unit 111. The actuator control processing unit 113 is a means for executing a computation process of generating a control signal used to conduct a drive control of the actuator 5 based on the control command signal and the safe signal.

For example, in a case where the actuator 5 is a motor and the drive circuit 4 is a main circuit of the inverter driving the motor, the actuator control processing unit 113 generates a pulse width modulation (PWM) signal of controlling ON/OFF of each switching element of the drive circuit 4. At this time, the actuator control processing unit 113 controls to increase or decrease the pulse width of the PWM signal, which is the control signal, in response to the control command signal and the safe signal.

The control signal output processing unit 115 is a means for outputting a control signal generated by the actuator control processing unit 113 from the control processor 11. In a case where the control signal output processing unit 115 receives a stop signal from the safe-state transition processing unit 116, the control signal output processing unit 115 stops the output of the control signal.

The diagnosis processing unit 114 is a means for diagnosing to determine whether the operation of the actuator control processing unit 113 is normal or abnormal. As illustrated in FIG. 11, the diagnosis processing unit 114 includes a program sequence diagnosis processing unit 1141 and a safe function diagnosis processing unit 1142. Here, the program sequence diagnosis processing unit 1141 is a means for diagnosing whether the operation of generating the control signal in response to the control command signal from among the operations of the actuator control processing unit 113 is normal or abnormal. Here, the safe function diagnosis processing unit 1142 is a means for diagnosing whether the operation of generating the control signal in response to the safe signal from among the operations of the actuator control processing unit 113 is normal or abnormal.

In the above diagnosis, the program sequence diagnosis processing unit 1141 and the safe function diagnosis processing unit 1142 detect abnormality of the ALU of the control processor 11 used in the actuator control processing unit 113, abnormality of a data path, abnormality of the register, abnormality of the internal RAM, abnormality of an address calculation means, abnormality of an interrupt processing means, abnormality of a control logic, and/or abnormality of a configuration register.

The diagnosis processing unit 114 cyclically repeats a diagnosis process using the program sequence diagnosis processing unit 1141 and a diagnosis process using the safe function diagnosis processing unit 1142. In a case where a diagnosis result indicative of a normal operation of the actuator control processing unit 113 is obtained, the diagnosis processing unit 114 supplies a reset signal to the WDT 12. Further, the safe-state transition processing unit 116 conducts a diagnosis process using the program sequence diagnosis processing unit 1141 or a diagnosis process using the safe function diagnosis processing unit 1142. In a case where a diagnosis result indicative of an abnormal operation of the actuator control processing unit 113 is determined, an abnormality signal is output to the safe-state transition processing unit 116. This abnormality signal includes information indicating that the control processor 11 is abnormal and information indicative of the content of the abnormality.

In a case where the diagnosis processing unit 114 diagnoses to determine that abnormality exists in the operation of the actuator control processing unit 113, the safe-state transition processing unit 116 functions as a safe state transition processing means that causes the control processor 11 to transfer to a safe state in which the operation rage is further limited than the operation range in the normal state. Specifically, within the embodiment, the safe state is a state where the control processor 11 is in hold (the internal state is not transited), and the control signal is not generated and output. In a case where the safe-state transition processing unit 116 receives the abnormality signal from a diagnosis processing unit 114, the safe-state transition processing unit 116 outputs the stop signal to the control signal output processing unit 115, outputs the abnormality signal as an abnormality report signal to the communication processing unit 111, and sets the control processor 11 to be in the hold state.

The structure of this embodiment is as described above.

Figure 2:
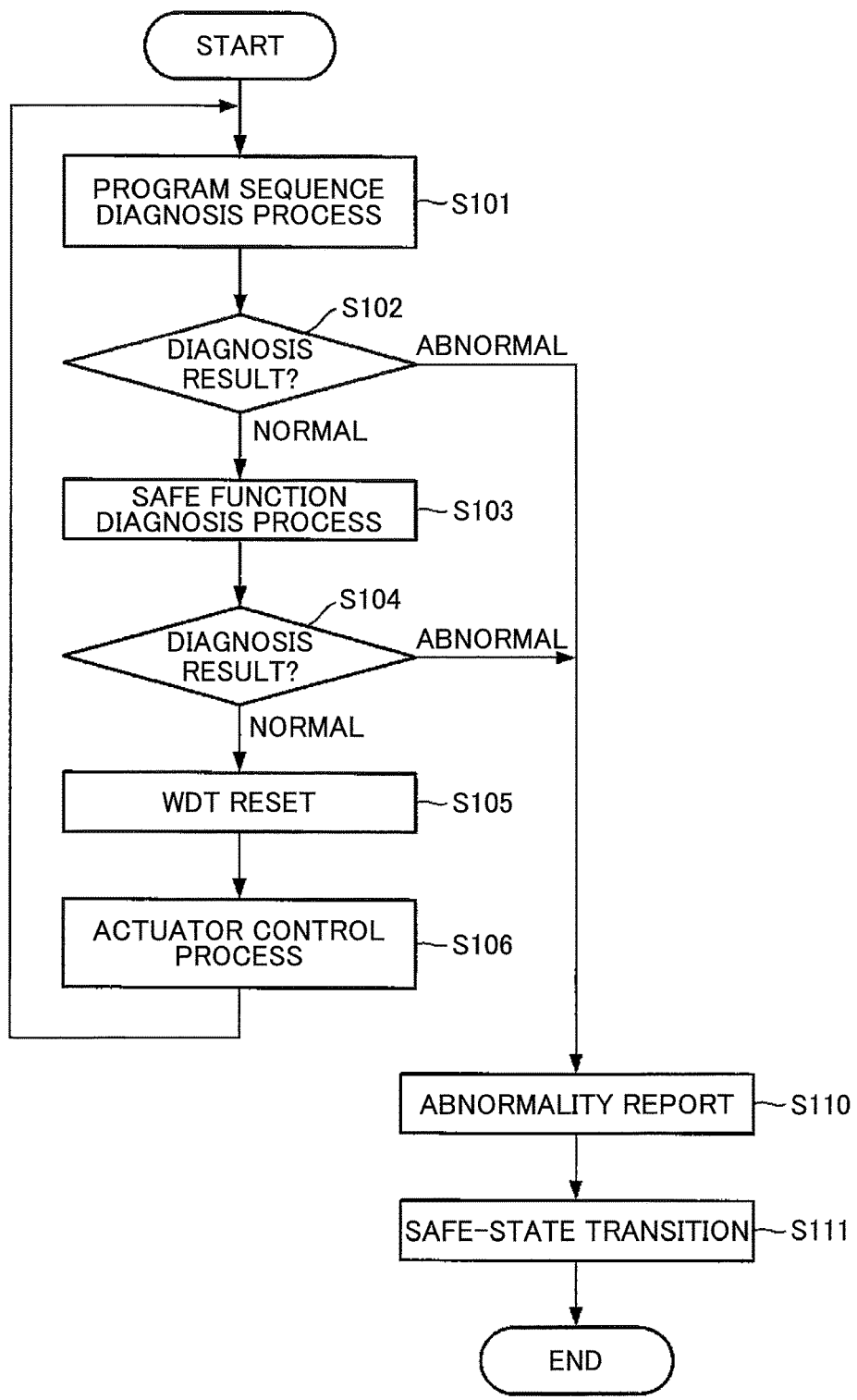
FIG. 2 is a flowchart of a control processor 11 of the drive control apparatus 1.

The operation of this embodiment is described next. FIG. 2 is a flowchart illustrating the process content by the control processor 11. When a start-up command is generated by supplying electric power to the drive control apparatus 1, step S101 is performed by the program sequence diagnosis processing unit 1141 to execute a program sequence diagnosis process. This program sequence diagnosis process is provided for the operation of generating the control signal in response to the control command signal from among operations of the actuator control processing unit 113.

Next, in step S102, the program sequence diagnosis processing unit 1141 determines whether the diagnosis result is normal or abnormal. In a case where the diagnosis result indicates that the operation of the actuator control processing unit 113 is abnormal, the process goes to step S110. In a case where the diagnosis result indicates that the operation of the actuator control processing unit 113 is normal, the process goes to step S103.

Next, in step S103, the safe function diagnosis processing unit 1142 performs a safe function diagnosis process. This program sequence diagnosis process is provided for the operation of generating the control signal in response to the safe signal from among the operations of the actuator control processing unit 113.

Next, in step S104, the safe function diagnosis processing unit 1142 determines whether the diagnosis result of the safe function diagnosis process is normal or abnormal. In a case where the diagnosis result indicates that the operation of the actuator control processing unit 113 is abnormal, the process goes to step S110. In a case where the diagnosis result indicates that the operation of the actuator control processing unit 113 is normal, the process goes to step S105.

Next, in step S105, the diagnosis processing unit 114 outputs a reset signal to the WDT 12 so as to reset the timer value of the WDT 12. Next, in step S106, the actuator control processing unit 113 performs an actuator control process as an original purpose. In this actuator control process, the actuator control processing unit 113 acquires the control command signal or the safe signal from the command input processing unit 112, generates the control signal based on the control command signal or the safe signal, and supplies the generated control signal to the control signal output processing unit 115.

After completing this step S106, the process returns to step S101. Thereafter, as long as the operation of the actuator control processing unit 113 is normal in the diagnosis results of the program sequence diagnosis process (step S101) and the safe function diagnosis process (step S103), the processes of steps S101, S102, S103, S104, S105, S106, and S101 are repeated in this order.

Meanwhile, if the diagnosis result indicates that the operation of the actuator control processing unit 113 is abnormal in the determination in step S102 or step S104, the process proceed to step S110. In this step S110, the diagnosis processing unit 114 outputs the abnormality signal to the safe-state transition processing unit 116. The safe-state transition processing unit 116 outputs an abnormality report signal to the communication processing unit 111. With this, the communication processing unit 111 sends the abnormality report signal to the higher-level controller 2. Thereafter, the communication processing unit 111 rejects the receipt of the control command signal and the safe signal, each from higher-level controller 2. However, in a case where the higher-level controller 2 determines the content of the abnormality report signal and sends the return command signal, the communication processing unit 111 receives this return command signal and restarts the receipt of the control command signal and the safe signal, each from the higher-level controller 2. Next, in step S111, the safe-state transition processing unit 116 performs a process to transfer to the safe state. Specifically, the safe-state transition processing unit 116 outputs a stop signal to the control signal output processing unit 115. With this, the control signal output processing unit 115 stops the output of the control signal from the actuator control processing unit 113 to the outside. Further, the safe-state transition processing unit 116 stops an internal clock to the control processor 11 to make the control processor 11 the hold state, and then finishes the process illustrated in FIG. 2.

Figure 3:
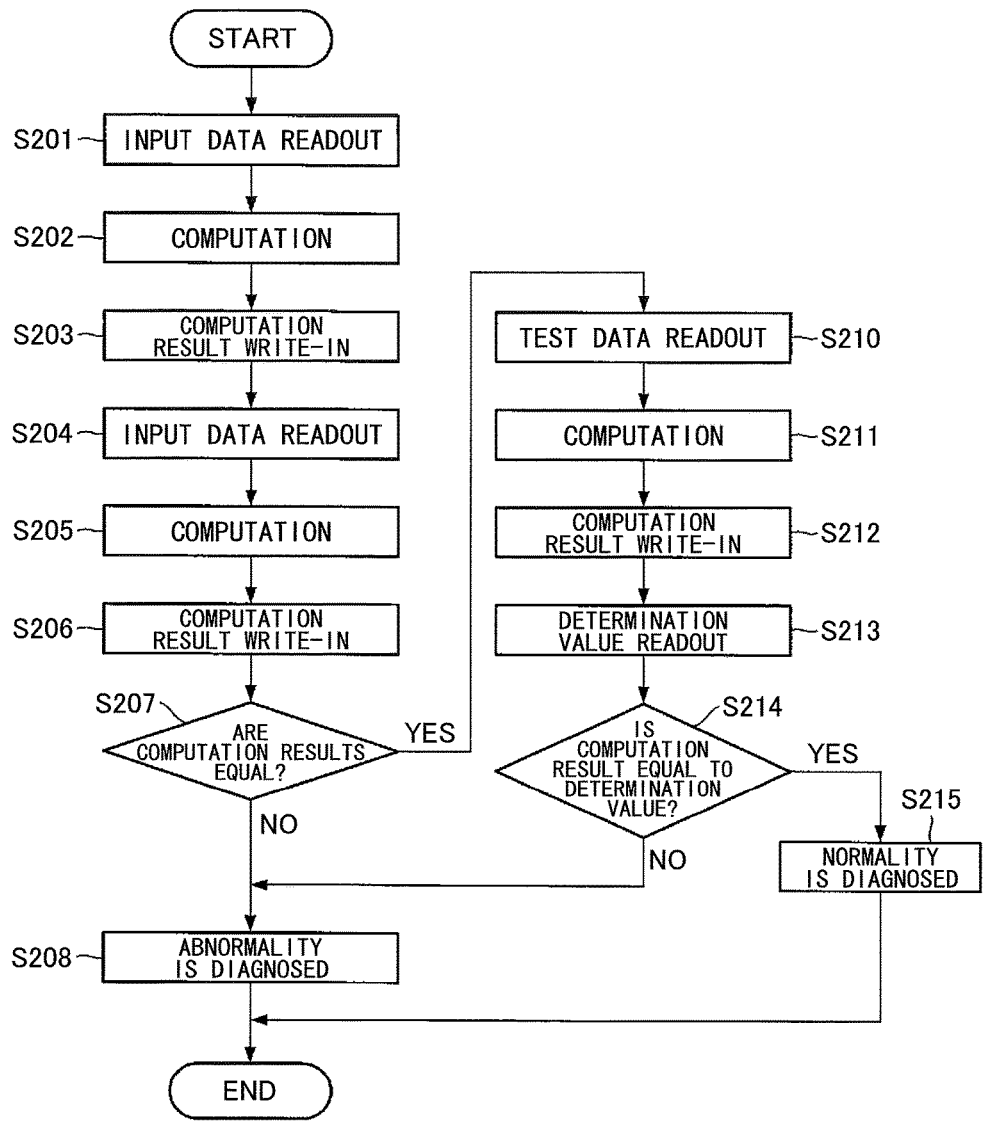
FIG. 3 is a flowchart of a safe function diagnosis process performed by the control processor 11.

FIG. 3 is a flowchart indicative of the process contents the safe function diagnosis process in step S103. After starting the safe function diagnosis process, the safe function diagnosis processing unit 1142 goes to step S201, reads the input data for safe function diagnosis from the ROM, and stores the read input data in the RAM. Next, in step S202, the safe function diagnosis processing unit 1142 supplies the input data to the actuator control processing unit 113 and causes the actuator control processing unit 113 to compute based on the input data. Next, in step S203, the safe function diagnosis processing unit 1142 writes the computation result obtained by the actuator control processing unit 113 in the RAM. Next, in step S204, the safe function diagnosis processing unit 1142 reads the input data for the safe function diagnosis again from the ROM and store the input data in the RAM. Next, in step S205, the safe function diagnosis processing unit 1142 supplies the input data to the actuator control processing unit 113 again and causes the actuator control processing unit 113 to compute based on the input data again. Next, in step S206, the safe function diagnosis processing unit 1142 writes the computation result obtained by the actuator control processing unit 113 in the RAM. Next, in step S207, the safe function diagnosis processing unit 1142 compares the computation result written in the RAM in step S203 with the computation result written in the RAM in step S206 and diagnoses to determine whether these computation results equal.

In a case where the determination result in step S207 is "NO", the process goes to step S208. Next, in step S208, the safe function diagnosis processing unit 1142 diagnoses to determine that the actuator control processing unit 113 is abnormal and finishes the safe function diagnosis process.

In a case where the determination result in step S207 is "YES", the process goes to step S210. Next, in step S210, the safe function diagnosis processing unit 1142 reads the test data for the safe function diagnosis from the ROM and store the test data in the RAM. Next, in step S211, the safe function diagnosis processing unit 1142 causes the actuator control processing unit 113 to calculate based on this test data. Next, in step S212, the safe function diagnosis processing unit 1142 writes the computation result obtained by the actuator control processing unit 113 in the RAM. Next, in step S213, the safe function diagnosis processing unit 1142 reads the determination value as an expectation value based on the test data from the ROM. Next, in step S214, the safe function diagnosis processing unit 1142 compares the computation result written in the RAM in step S212 with the determination value read out of the ROM in step S213 and diagnoses to determine whether the computation result and the determination value equal. In a case where the determination result in step S217 is "NO", the process goes to the above step S208. In a case where the determination result in step S214 is "YES", the process goes to step S215. Next, in step S215, the safe function diagnosis processing unit 1142 diagnoses to determine that the actuator control processing unit 113 is normal and finishes the safe function diagnosis process.

The content of the safe function diagnosis process in step S103 illustrated in FIG. 2 is as described above. The content of the program sequence diagnosis process in step S101 is similar to the content of the safe function diagnosis process.

Figure 4:
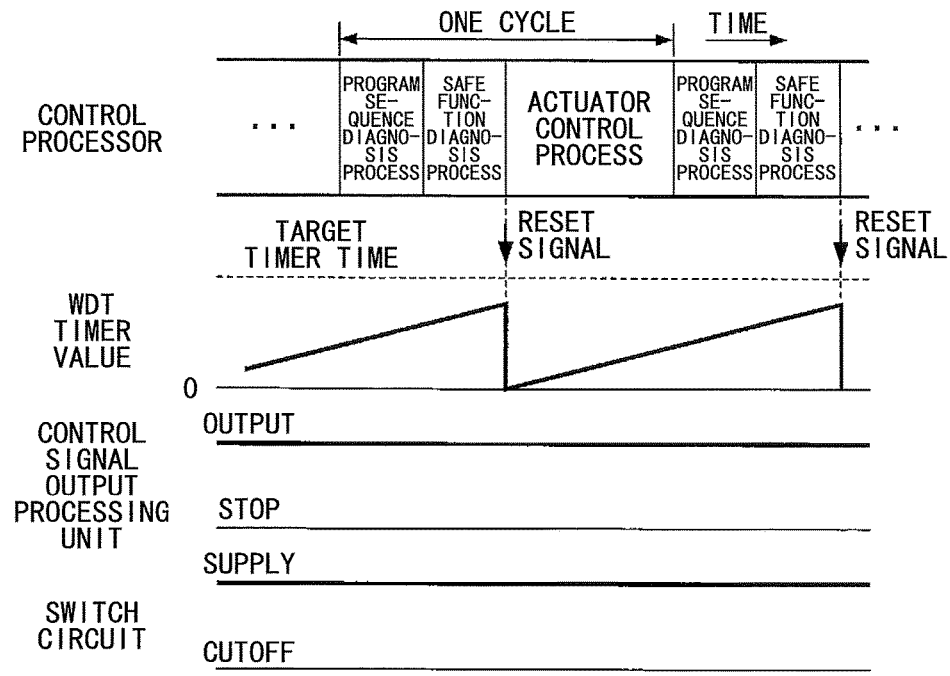
FIG. 4 is a time chart illustrating a first operational example of the control processor 11.
Figure 5:
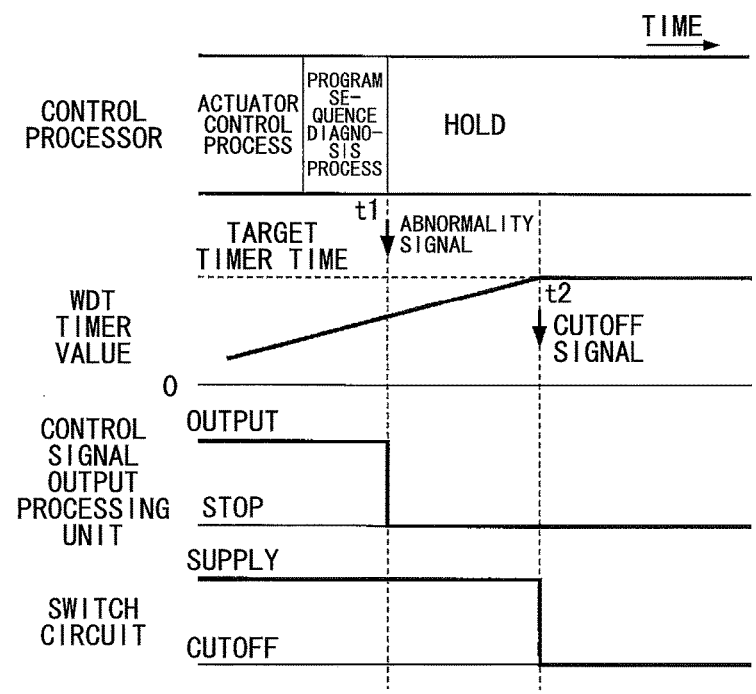
FIG. 5 is a time chart illustrating a second operational example of the control processor 11.
Figure 6:
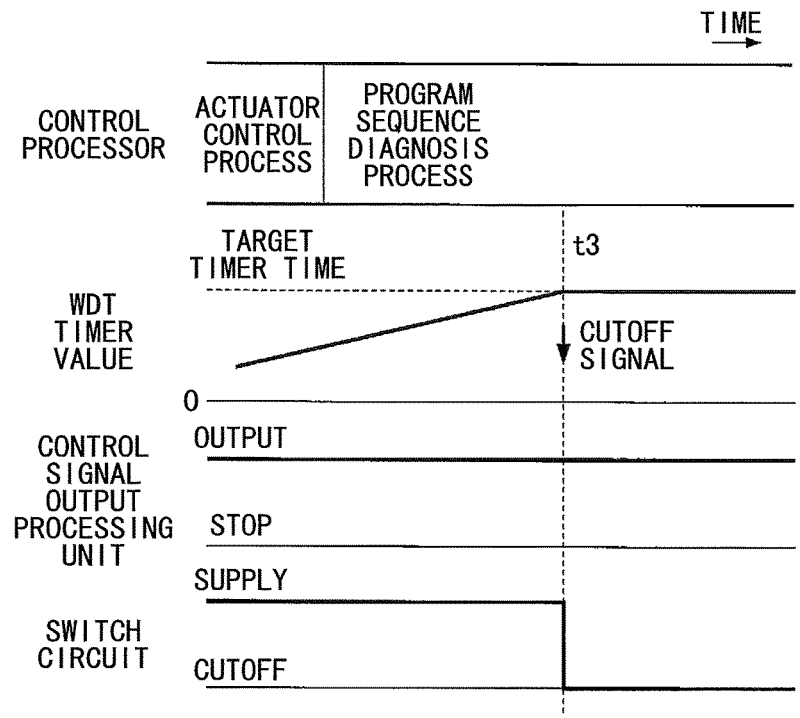
FIG. 6 is a time chart illustrating a third operational example of the control processor 11.

FIGS. 4 to 6 are time charts illustrating operational examples of the embodiments. FIG. 4 illustrates an operational example in a case where the actuator control processing unit 113 is determined to be normal in both of the program sequence diagnosis process (step S101) and the safe function diagnosis process (step S103) in FIG. 2. In this case, as illustrated in FIG. 4, the control processor 11 cyclically repeats the program sequence diagnosis process, the safe function diagnosis process, and the actuator control process.

Here, a target timer time while the WDT 12 is timed out after resetting the WDT 12 is longer than a total required time for the program sequence diagnosis process, the safe function diagnosis process, and the actuator control process for one cycle. Therefore, after the WDT 12 is reset, before the timer value of the WDT 12 reaches the target timer time, the actuator control processing unit 113 is determined to be normal in both of the program sequence diagnosis process (step S101) and the safe function diagnosis process (step S103), the WDT 12 is reset. Therefore, the WDT 12 is not timed out, and therefore the switch circuit is not cut off.

Further, in a case where the actuator control processing unit 113 is determined to be normal in both of the program sequence diagnosis process (step S101) and the safe function diagnosis process (step S103), the diagnosis processing unit 114 does not output the abnormality signal, and the safe-state transition processing unit 116 does not outputs the stop signal to the control signal output processing unit 115. Accordingly, the control signal output processing unit 115 outputs the control signal generated by the actuator control processing unit 113, and the switch circuit 3 supplies this control signal to the drive circuit 4.

FIG. 5 illustrates an operation example where the abnormality of the operation of the actuator control processing unit is determined in the program sequence diagnosis process (step S101) illustrated in FIG. 2 and the abnormality signal is output (step S110 in FIG. 2) from the diagnosis processing unit 114 at a time t1. Specifically, the safe-state transition processing unit 116 outputs the stop signal to the control signal output processing unit 115 when this abnormality signal is output. As a result, as illustrated in FIG. 5, the control signal output processing unit 115 stops the output of the control signal generated by the actuator control processing unit 113.

Within the embodiment, the target timer time of the WDT 12 is longer than the cycle, in which the program sequence diagnosis process is repeated. Therefore, as exemplified in FIG. 5, the timer value of the WDT 12 reaches the target timer time at a time point t2 later than a time point t1 and the WDT 12 outputs the cutoff signal to the switch circuit 3. As a result, the switch circuit 3 is turned off.

According to this embodiment, in a case where the program sequence diagnosis processing unit 1141 detects the operational abnormality of the control processor 11, the safe-state transition processing unit 116 stops the output of the control signal before the WDT 12 cuts off the switch circuit 3. The operation is similar in a case where the safe function diagnosis processing unit 1142 detects the operational abnormality of the control processor 11. Therefore, even in a situation where the WDT 12 cannot normally work, an erroneous operation of the control processor 11 can be prevented from influencing the control target apparatus such as the drive circuit 4 and the actuator 5, for example.

Further, within the embodiment, the abnormality report signal is output to the higher-level controller 2 from the control processor. Therefore, the higher-level controller 2 can recognize the operational abnormality of the control processor to appropriately deal with the operational abnormality. Further, within the embodiment, when the abnormality is diagnosed to exist, the state of the control processor 11 is transited to the hold state by the control processor 11 itself. Therefore, it is possible to prevent the control processor 11 from proceeding with the operational abnormality and prevent the control processor 11 from undergoing a fatal failure.

FIG. 6 illustrates an operation example where the program sequence diagnosis processing unit 1141 starts the execution of the program sequence diagnosis process (step S101) illustrated in FIG. 2, thereafter the operational abnormality occurs in the program sequence diagnosis processing unit 1141, and the timer value of the WDT 12 reaches the target timer time at a time point t3 without the reset signal output by the diagnosis processing unit 114. Within the embodiment, in a case where the operational abnormality occurs in the program sequence diagnosis processing unit 1141, the timer value reaches the target timer time, the switch circuit 3 is turned off by the cutoff signal, and therefore the erroneous operation of the control processor 11 from influencing the control target apparatus such as the drive circuit 4 and the actuator 5. The operation is similar in a case where the operational abnormality occurs in the safe function diagnosis processing unit 1142.

Other Embodiments

The embodiment of the present invention has been described above. However, there are other embodiments in the present invention. For example, there are following embodiments.

(1) Within the above embodiment, in steps S201 to S206 illustrated in FIG. 3, the actuator control processing unit 113 computes twice based on the input data, and the program sequence diagnosis processing unit 1141 compares the computation results in step S207. However, the number of the computations is not limited to two. The actuator control processing unit 113 may compute three times or more, and the program sequence diagnosis processing unit 1141 may compare the computation results. As the number of the computations is increased, it becomes easier to detect the operational abnormality. However, a load on the control processor 11 increases more. Therefore, the number of the computations may be appropriately determined in response to the performance of the control processor 11.

(2) Within the above embodiment, the safe function diagnosis process is performed after executing the program sequence diagnosis process. However, this order may be inversed. Further, after the process of steps S210 to S214, the process of steps S201 to S207 may be executed.

(3) Within the above embodiment, the computation result obtained by the actuator control processing unit 113 is compared with the determination value. However, the operational abnormality of the control processor 11 may be detected by comparing the required time for the computation in the actuator control processing unit 113 with a predetermined reference time. Further, in the safe function diagnosis process illustrated in FIG. 3, the required time for the computation in step S202 and the required time for the computation in step S205 are compared. If the difference between these required times exceed a predetermined threshold value, the operation of the actuator control processing unit 113 may be diagnosed to be abnormal, for example. Further, in a case where the control processor 11 proceeds with multiple processes in parallel by, for example, a time sharing control. The order of conducting the multiple processes can be monitored. In a case where the order of the processes is not a predetermined order, the operation of the control processor 11 may be diagnosed to be abnormal. Alternatively, the required times of the processes may be compared with a predetermined reference time and a difference between any one of the required times and the predetermined reference time exceeds a predetermined time, the operation of the control processor 11 may be diagnosed to be abnormal. Alternatively, determination based on the order of the processes and determination based on the required time may be simultaneously used to diagnose to determine whether the operation of the control processor 11 is abnormal.

(4) Within the above embodiment, when the diagnosis processing unit 114 supplies the abnormality signal to the safe-state transition processing unit 116, the safe-state transition processing unit 116 supplies the stop signal to the control signal output processing unit 115, and the control signal output processing unit 115 stops the supply of the control signal. However, in this case, the safe-state transition processing unit 116 may cause the actuator control processing unit 113 to generate the control signal corresponding to the safe state instead of supplying the stop signal to the control signal output processing unit 115. Here, the safe state is a driving state of the actuator 5 whose operation range is further limited than the operation range in a normal state. The safe state includes a driving state of the actuator 5 whose speed is limited, the stop of the actuator 5. Further, the safe-state transition processing unit 116 may cause the actuator control processing unit 113 to generate the control signal corresponding to the safe state in conformity with the contents of the abnormality signal. Therefore, the content of the abnormality signal and the safe state or a method for determining the safe state may be previously stored by the ROM or the RAM of the control processor 11. In a case where the control processor 11 is diagnosed to have the operational abnormality, the safe-state transition processing unit 116 causes the actuator control processing unit 113 to generate the control signal for rendering the actuator 5 this safe state.

In a case where the control processor 11 is diagnosed to have the operational abnormality, the safe-state transition processing unit 116 causes the actuator control processing unit 113 to generate the control signal for gradually transferring the actuator 5 to be in the safe state (for example, a stop state) along with a passage of time.

The safe-state transition processing unit 116 preferably outputs the stop signal to the control signal output processing unit 115 after a passage of a predetermined time after an instruction of generating the control signal corresponding to the safe state is sent to the actuator control processing unit 113. The diagnosis processing unit 114 preferably continues to supply the reset signal until the safe-state transition processing unit 116 outputs the stop signal to the control signal output processing unit 115. With this, the control signal that is generated by the actuator control processing unit 113 so as to correspond to the safe state is supplied to the drive circuit 4 to control the actuator 5 during a predetermined time. This predetermined time may be a preset constant time or may be determined in response to the operation speed of the actuator 5 at a time of detecting the abnormality of the control processor 11. According to this mode, an accident caused by a sudden stop of the actuator 5 can be prevented.

(5) Within the above embodiment, the program sequence diagnosis process, the safe function diagnosis process, and the actuator control process are proceeded in parallel using the time sharing control of the program sequence diagnosis process, the safe function diagnosis process, and the actuator control process in a unit of task to diagnose the control processor 11 in parallel with the generation of the control signal by the control processor 11. However, the program sequence diagnosis process, the safe function diagnosis process, and the actuator control process can be advanced in parallel by the time sharing control in a time unit shorter than the unit of task.

Figure 7:
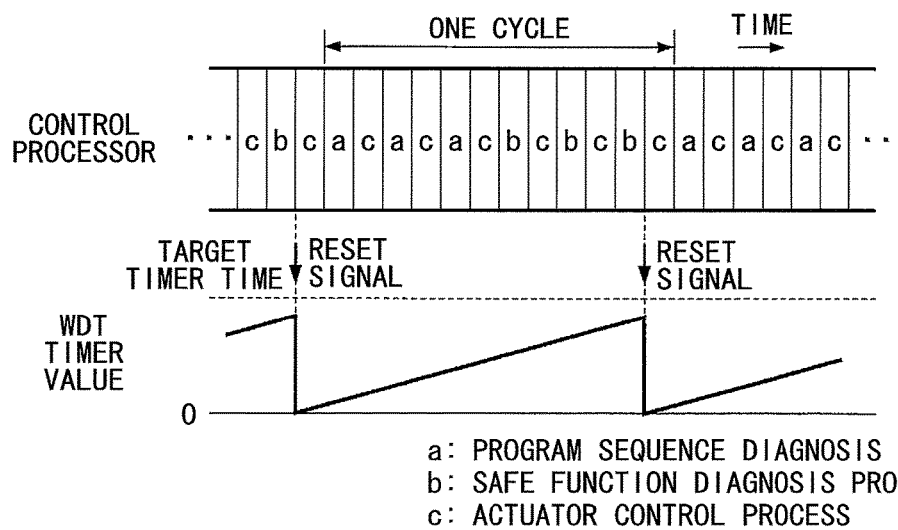
FIG. 7 is a time chart illustrating an operational example of the control processor on another embodiment of the present invention.

FIG. 7 is a time chart indicative of a mode of the time sharing control for the program sequence diagnosis process, the safe function diagnosis process, and the actuator control process. In this example, the time axis is divided into multiple time slots each having a certain time length. In an example illustrated in FIG. 7, a time slot a or b is interposed between each adjacent pair of time slots c from among multiple time slots c. The control processor 11 uses the multiple time slots c that are discrete to execute the actuator control process. After the control processor 11 executes the program sequence diagnosis process using the time slots an equal to a predetermined number, the control processor 11 executes the safe function diagnosis process using the time slots b equal to a predetermined number. In a case where the operation of the control processor is normal through the program sequence diagnosis process and the safe function diagnosis process, the operation of outputting the reset signal to the WDT 12 is cyclically repeated. According to this mode, the time intervals between the multiple actuator control processes can be made short. The short interval is effective in a case where the required time for the program sequence diagnosis process and/or the safe function diagnosis process for one cycle are long.

(6) The present invention is of course applicable to a drive control apparatus using a multicore CPU including multiple CPU cores. In this case, the multiple CPU cores execute the actuator control process, and the computation results obtained by the multiple CPU cores are compared to diagnose whether each CPU core has the operational abnormality, for example. In this case, it is cyclically checked whether the abnormality of the operation of each core is detected. In a case where the abnormality is not detected, the reset signal is output to the WDT 12. In a case where the abnormality is detected, the control processor 11 may be transferred to the safe state.

(7) Within the above embodiment, the diagnosis processing unit 114 for diagnosing the operation of the control processor 11 is implemented by software. However, the diagnosis processing unit 114 may be implemented by hardware.

As described above, according to the invention, when the operational abnormality of avoiding the control processor from being normally reset or the operational abnormality unsolved after resetting the control processor occurs in the control processor, the control target apparatus can be prevented from suffering from the bad influence of the operational abnormality in the control processor and the drive control system can be maintained to be in the safe state.

Reference symbols typically designate as follows:
1: drive control apparatus;
2: higher-level controller;
3: switch circuit;
4: drive circuit;
5: actuator;
11: control processor;
12: WDT;
111: communication processing unit;
112: command input processing unit;
113: actuator control processing unit;
114: diagnosis processing unit;
115: control signal output processing unit;
116: safe-state transition processing unit;
1141: program sequence diagnosis processing unit; and
1142: safe function diagnosis processing unit.

Although the embodiments of the drive control apparatus have been described, the present invention is not limited to these embodiments, but various variations and modifications may be made without departing from the scope of the present invention.

What is claimed is:

1. A drive controller comprising:
   a control processor configured to generate a control signal;
   a switch circuit configured to supply or not to supply the control signal output by the control processor to a driven apparatus; and
   a watchdog timer configured to reset a timer value in response to a reset signal supplied from the control processor and complete measurement of a target timer time after resetting the timer value so as to continuously output a cutoff signal for cutting off a supply of the control signal from the control processor to the driven apparatus.

2. The drive controller according to claim 1,
   wherein the control processor includes
      a diagnosis means configured to diagnose an operation of the control processor, and
      a safe state transition processing means configured to cause the control processor to be transferred to a safe state, in which an operation range is further limited to than in a normal state, in a case where the diagnosis means determines that the operation of the control processor has abnormality.

3. The drive controller according to claim 2,
   wherein the diagnosis means repeatedly diagnoses in a cycle shorter than the target timer time and outputs the reset signal in a case where the diagnosis means determines that the control processor is normal.

4. The drive controller according to claim 2,
   wherein the safe state transition processing means causes the control processor to output the control signal for the safe state, in which the operation range is further limited to than in the normal state, in the case where the diagnosis means determines that the operation of the control processor has the abnormality.

5. The drive controller according to claim 4,
   wherein the safe state transition processing means causes the control processor to stop the output the control signal in the case where the diagnosis means determines that the operation of the control processor has the abnormality.

6. The drive controller according to claim 4,
   wherein the safe state transition processing means causes the control processor to output the control signal for transferring an operational state of the driven apparatus to the safe state in response to a passage of time in the case where the diagnosis means determines that the operation of the control processor has the abnormality.

7. The drive controller according to claim 2,
   wherein the control processor includes a communication means configured to report the abnormality of the operation of the control processor to a higher-level controller in the case where the diagnosis means determines that the operation of the control processor has the abnormality.

8. The drive controller according to claim 2,
   wherein the safe state transition processing means causes the control processor to be in a hold state in the case where the diagnosis means determines that the operation of the control processor has the abnormality.

* * * * *